United States Patent
Tao et al.

(10) Patent No.: US 12,175,856 B2
(45) Date of Patent: Dec. 24, 2024

(54) HAPTIC RENDERING DEVICE, METHOD, DISPLAY DEVICE AND CONTROLLER

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Yongchun Tao, Beijing (CN); Yuju Chen, Beijing (CN); Xiaofeng Yin, Beijing (CN); Yingzi Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/795,762

(22) PCT Filed: Sep. 26, 2021

(86) PCT No.: PCT/CN2021/120569
§ 371 (c)(1),
(2) Date: Jul. 27, 2022

(87) PCT Pub. No.: WO2023/044841
PCT Pub. Date: Mar. 30, 2023

(65) Prior Publication Data
US 2024/0185693 A1    Jun. 6, 2024

(51) Int. Cl.
*G08B 6/00*    (2006.01)

(52) U.S. Cl.
CPC ................................ *G08B 6/00* (2013.01)

(58) Field of Classification Search
CPC .... G06F 3/016; G06F 3/04886; G06F 3/0488; G06F 2203/014; G06F 3/0443; G06F 3/0446
See application file for complete search history.

(56) References Cited

U.S. PATENT DOCUMENTS 5,233,874 A      8/1993   Putty et al.
2013/0307789 A1*  11/2013  Karamath ............... G06F 3/016
                                                   345/173

(Continued)

FOREIGN PATENT DOCUMENTS

CN    107665051 A    2/2018
CN    108628530 A    10/2018

(Continued)

*Primary Examiner* — Mirza F Alam
(74) *Attorney, Agent, or Firm* — The Webb Law Firm

(57) ABSTRACT

The present disclosure provides a haptic rendering device, a method, a display device and a controller. The haptic rendering device includes: a substrate; a first driver arranged on the substrate and configured to vibrate and drive the substrate to vibrate after receiving a first driving signal; a vibration sensor arranged on the substrate and configured to generate a first detection voltage signal according to an amplitude or a frequency at which the first driver vibrates together with the substrate in a case where the substrate vibrates; and a controller configured to output the first driving signal to the first driver, receive the first detection voltage signal, and adjust the first driving signal according to the first detection voltage signal.

17 Claims, 6 Drawing Sheets

(56) References Cited

U.S. PATENT DOCUMENTS

| | | | |
|---|---|---|---|
| 2014/0157902 A1* | 6/2014 | Sugiura | G01S 15/50 |
| | | | 73/627 |
| 2016/0179260 A1* | 6/2016 | Ham | G06F 3/0412 |
| | | | 345/173 |
| 2018/0033262 A1 | 2/2018 | Shah et al. | |
| 2019/0235628 A1* | 8/2019 | Lacroix | G06F 3/016 |
| 2020/0150767 A1 | 5/2020 | Karimi Eskandary et al. | |
| 2022/0238782 A1* | 7/2022 | Hua | H02N 2/0075 |

FOREIGN PATENT DOCUMENTS

| | | | |
|---|---|---|---|
| CN | 110083229 A | 8/2019 | |
| CN | 110875692 A | 3/2020 | |
| CN | 111176436 A | 5/2020 | |
| CN | 113238679 A | 8/2021 | |
| EP | 3620893 A1 | 3/2020 | |
| JP | 2014020868 A | 2/2014 | |

\* cited by examiner

HAPTIC RENDERING DEVICE, METHOD, DISPLAY DEVICE AND CONTROLLER

CROSS-REFERENCE TO RELATED APPLICATION

The present application is a U.S. National Stage Application under 35 U.S.C. § 371 of International Patent Application No. PCT/CN2021/120569, filed on Sep. 26, 2021, the disclosure of which incorporated by reference herein in its entirety.

TECHNICAL FIELD

The present disclosure relates to a haptic rendering device, a method, a display device and a controller.

BACKGROUND

The main ways of human sensing system comprises vision, hearing and touch. Currently, both vision and hearing are sensed and presented by relatively mature methods. For example, video cameras and photo cameras are used to simulate the acquisition of images by humans, display screens and other display devices are used to present images, devices such as silicon microphones, electret microphones, and piezoelectric microphones are used to simulate the acquisition of sound signals in the environment by humans, and headphones and stereos using various principles such as static electricity, dynamic coil, and piezoelectricity are used to present various wonderful sounds for humans.

For the haptic system, due to its relatively complex mechanism, there involves perception of a plurality of physical signals such as mechanical, temperature, chemical, and humidity signals in the environment by human body. The research and industrialization are relatively late. From the early resistive touch screen to the demand in the current large-scale application of a capacitive touch screen as well as application scenarios such as virtual reality, there is an urgent demand for tactile perception and haptic rendering. Haptic rendering in the related art is mainly implemented by vibration feedback, in which excitation of human body is realized by vibration of a contact surface. In surface haptic rendering, the characteristics of an object are simulated on the contact surface so that a more realistic tactile feeling is realized for human body, and an efficient and natural interaction effect can be realized on the multimedia terminal.

SUMMARY

According to an aspect of embodiments of the present disclosure, a haptic rendering device is provided. The haptic rendering device comprises: a substrate; a first driver arranged on the substrate and configured to vibrate and drive the substrate to vibrate after receiving a first driving signal; a vibration sensor arranged on the substrate and configured to generate a first detection voltage signal according to an amplitude or a frequency at which the first driver vibrates together with the substrate in a case where the substrate vibrates; and a controller configured to output the first driving signal to the first driver, receive the first detection voltage signal, and adjust the first driving signal according to the first detection voltage signal.

In some embodiments, the controller is configured to reduce an amplitude or a duty cycle of the first driving signal in a case where the first detection voltage signal is greater than a threshold value, or increase the amplitude or the duty cycle of the first driving signal in a case where the first detection voltage signal is less than the threshold value.

In some embodiments, the vibration sensor comprises an accelerometer, a velocity sensor, or a displacement sensor.

In some embodiments, the accelerometer comprises at least one of a piezoelectric accelerometer, a capacitive comb accelerometer, a bulk-silicon capacitive accelerometer, or a piezoresistive accelerometer.

In some embodiments, the piezoelectric accelerometer comprises: a first bottom electrode on the substrate; a first portion of the substrate below the first bottom electrode, wherein the first portion comprises a recess on a side away from the first bottom electrode and a mass block surrounded by the recess, wherein a thickness of part of the first portion at a bottom of the recess in a direction perpendicular to the substrate is less than a thickness of the mass block in the direction perpendicular to the substrate; a first piezoelectric thin film layer on a side of the first bottom electrode away from the substrate; and a first top electrode on a side of the first piezoelectric thin film layer away from the substrate; wherein the first bottom electrode and the first top electrode are electrically connected to the controller, and an orthographic projection of the recess on the substrate at least partially overlaps with an orthographic projection of the first piezoelectric thin film layer on the substrate.

In some embodiments, the piezoelectric accelerometer further comprises: a first lead-out electrode electrically connected to the first bottom electrode; and a second lead-out electrode electrically connected to the first top electrode; wherein the first bottom electrode is electrically connected to the controller through the first lead-out electrode, and the first top electrode is electrically connected to the controller through the second lead-out electrode.

In some embodiments, a shape of the recess comprises a circular ring, a square ring or a hexagonal ring from a perspective perpendicular to the substrate.

In some embodiments, the first bottom electrode comprises a plurality of first sub-bottom electrodes, wherein the plurality of first sub-bottom electrodes are electrically connected to each other; the recess comprises a plurality of sub-recesses, and the mass block comprises a plurality of sub-mass blocks, wherein the plurality of sub-mass blocks are surrounded by the plurality of sub-recesses in a one-to-one correspondence, and the plurality of sub-recesses are below the plurality of first sub-bottom electrodes in a one-to-one correspondence; the first piezoelectric film layer comprises a plurality of first sub-piezoelectric film layers, wherein the plurality of first sub-piezoelectric film layers are on a side of the plurality of first sub-bottom electrodes away from the substrate in a one-to-one correspondence; and the first top electrode comprises a plurality of first sub-top electrodes, wherein the plurality of first sub-top electrodes are on a side of the plurality of first sub-piezoelectric thin film layers away from the substrate in a one-to-one correspondence.

In some embodiments, the first driver comprises: a second bottom electrode on the substrate; a second portion of the substrate below the second bottom electrode; a second piezoelectric thin film layer on a side of the second bottom electrode away from the substrate; and a second top electrode on a side of the second piezoelectric thin film layer away from the substrate; wherein the second bottom electrode and the second top electrode are electrically connected to the controller.

In some embodiments, the first driver further comprises: a third lead-out electrode electrically connected to the second bottom electrode; and a fourth lead-out electrode electrically connected to the second top electrode; wherein the second bottom electrode is electrically connected to the controller through the third lead-out electrode, and the second top electrode is electrically connected to the controller through the fourth lead-out electrode.

In some embodiments, a material of the first bottom electrode is the same as a material of the second bottom electrode; a material of the first piezoelectric thin film layer is the same as a material of the second piezoelectric thin film layer; and a material of the first top electrode is the same as a material of the second top electrode.

In some embodiments, the second piezoelectric thin film layer comprises a plurality of second sub-piezoelectric thin film layers, wherein the plurality of second sub-piezoelectric thin film layers are spaced apart from each other and arranged along an extending direction of the second bottom electrode.

In some embodiments, the first driver comprises a plurality of first drivers arranged on the substrate along a first direction; and the vibration sensor comprises a plurality of vibration sensors arranged on the substrate along a second direction; wherein the first direction is perpendicular to the second direction.

In some embodiments, the haptic rendering device further comprises a piezoelectric transformer arranged on the substrate, electrically connected between the controller and the first driver, and configured to receive the first driving signal from the controller, amplify the first driving signal and output an amplified first driving signal to the first driver to drive the first driver to vibrate.

In some embodiments, the haptic rendering device further comprises a second driver arranged on the substrate, and configured to vibrate and drive the substrate to vibrate after receiving a second driving signal, wherein a vibration frequency of the second driver is less than a vibration frequency of the first driver; wherein the vibration sensor is further configured to generate a second detection voltage signal according to an amplitude or a frequency at which the second driver vibrates together with the substrate in a case where the substrate vibrates; and the controller is further configured to output the second driving signal to the second driver, receive the second detection voltage signal, and adjust the second driving signal according to the second detection voltage signal.

According to another aspect of the embodiments of the present disclosure, a display device is provided. The device comprises the haptic rendering device described above.

According to another aspect of the embodiments of the present disclosure, a haptic rendering method is provided. The haptic rendering method comprises: outputting a first driving signal to a first driver arranged on a substrate to cause the first driver to vibrate and drive the substrate to vibrate; generating a first detection voltage signal by a vibration sensor arranged on the substrate according to an amplitude or a frequency at which the first driver vibrates together with the substrate in a case where the substrate vibrates; and adjusting the first driving signal according to the first detection voltage signal.

In some embodiments, the adjusting of the first driving signal according to the first detection voltage signal comprises: reducing an amplitude or a duty cycle of the first driving signal in a case that the first detection voltage signal is greater than a threshold value; or increasing the amplitude or the duty cycle of the first driving signal in a case where the first detection voltage signal is less than the threshold value.

According to another aspect of the embodiments of the present disclosure, a controller is provided. The controller comprises: a memory; and a processor coupled to the memory, wherein the processor is configured to implement the method described above based on instructions stored in the memory.

According to another aspect of the embodiments of the present disclosure, a non-transitory computer readable storage medium is provided. The non-transitory computer readable storage medium has computer program instructions stored thereon which, when executed by a processor, implement the method described above.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description with reference to the accompanying drawings, in which.

Figure 1:
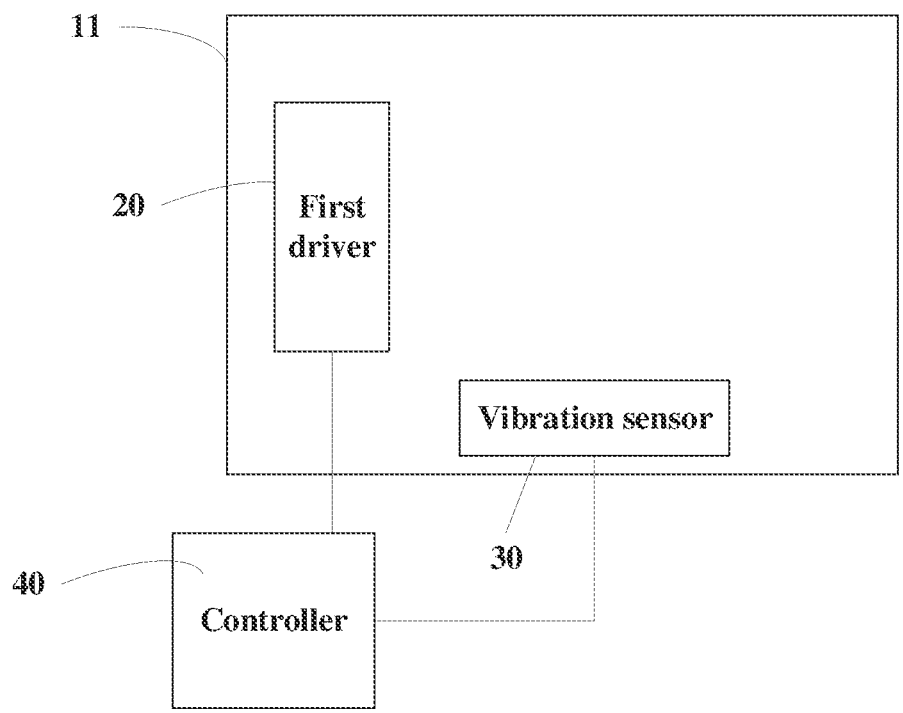
FIG. 1 is a schematic structural view showing a haptic rendering device according to an embodiment of the present disclosure.

It should be understood that the dimensions of various parts shown in the accompanying drawings are not necessarily drawn according to actual proportional relations. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include", or the like means that the element before the word covers the element (s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

FIG. 1 is a schematic structural view showing a haptic rendering device according to an embodiment of the present disclosure.

As shown in FIG. 1, the haptic rendering device comprises a substrate 11. For example, the substrate 11 is a glass substrate.

The haptic rendering device further comprises a first driver 20. The first driver 20 is arranged on the substrate 11. The first driver 20 is configured to vibrate and drive the substrate to vibrate after receiving a first driving signal.

The haptic rendering device further comprises a vibration sensor 30. The vibration sensor 30 is arranged on the substrate 11. The vibration sensor 30 is configured to generate a first detection voltage signal according to an amplitude or a frequency at which the first driver 20 vibrates together with the substrate 11 in a case where the substrate 11 vibrates.

In some embodiments, the vibration sensor comprises an accelerometer, a velocity sensor, or a displacement sensor.

For example, the accelerometer comprises at least one of a piezoelectric accelerometer, a capacitive comb accelerometer, a bulk-silicon capacitive accelerometer, or a piezoresistive accelerometer. For example, the velocity sensor comprises at least one of a laser type velocity sensor or a linear velocity sensor. For example, the displacement sensor comprises at least one of a capacitive displacement sensor or an eddy current displacement sensor.

The haptic rendering device further comprises a controller 40. The controller 40 is configured to output the first driving signal to the first driver 20, receive the first detection voltage signal, and adjust the first driving signal according to the first detection voltage signal.

So far, a haptic rendering device according to some embodiments of the present disclosure is provided. The haptic rendering device comprises: a substrate; a first driver arranged on the substrate and configured to vibrate and drive the substrate to vibrate after receiving a first driving signal; a vibration sensor arranged on the substrate and configured to generate a first detection voltage signal according to an amplitude or a frequency at which the first driver vibrates together with the substrate in a case where the substrate vibrates; and a controller configured to output the first driving signal to the first driver, receive the first detection voltage signal, and adjust the first driving signal according to the first detection voltage signal. In this way, the first driving signal can be optimized so that when the first driving signal causes the first driver to drive the substrate to vibrate, a first driver-substrate resonant body can operate in a stable state, thereby bringing a stable haptic experience to the user.

For example, the controller 20 is configured to reduce an amplitude or a duty cycle of the first driving signal in a case where the first detection voltage signal is greater than a threshold value (which may be referred to as a first threshold value), or increase the amplitude or the duty cycle of the first driving signal in a case where the first detection voltage signal is less than the threshold value. In this way, the first driving signal can be optimized so that when the first driving signal causes the first driver to drive the substrate to vibrate, a first driver-substrate resonant body can operate in a stable state, thereby bringing a stable haptic experience to the user.

It is to be noted that, the above-described threshold may be preset according to actual needs or actual conditions. For example, the threshold may be preset according to different device structures, different screens (the screen where the substrate is situated), or surface conditions of different objects displayed on the screen, and the threshold may be preset by way of training.

Figure 2:
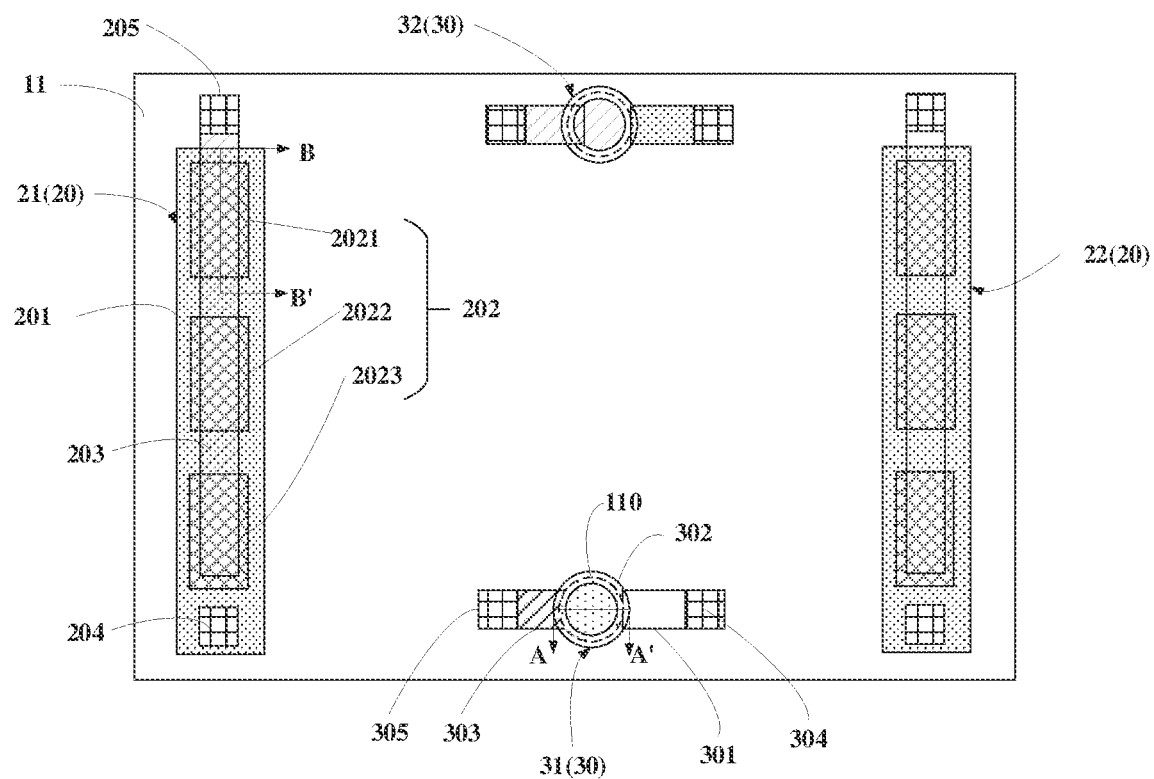
FIG. 2 is a schematic structural view showing a haptic rendering device according to another embodiment of the present disclosure.

FIG. 2 is a schematic structural view showing a haptic rendering device according to another embodiment of the present disclosure.

As shown in FIG. 2, the haptic rendering device comprises a substrate 11, a first driver 20, a vibration sensor 30 and a controller 40 (not shown in FIG. 2).

In some embodiments, as shown in FIG. 2, the first driver 20 comprises a plurality of first drivers 21 and 22. The plurality of first drivers 21 and 22 are arranged on the substrate 11 along a first direction. In some embodiments, as shown in FIG. 2, the vibration sensor 30 comprises a plurality of vibration sensors 31 and 32. The plurality of vibration sensors 31 and 32 are arranged on the substrate 11 along a second direction. The first direction is perpendicular to the second direction. For example, the first direction is a lateral direction of the substrate, and the second direction is a longitudinal direction of the substrate.

The first driver 20 and the vibration sensor 30 are located close to different edges of the substrate respectively. For example, as shown in FIG. 2, one first driver 21 is close to a left edge of the substrate and the other first driver 22 is close to a right edge of the substrate; and one vibration sensor 31 is close to a lower edge of the substrate, and the other vibration sensor 32 is close to an upper edge of the substrate edge. The first driver 20 and the vibration sensor 30 are arranged at a position close to edges of the substrate, without affecting the arrangement of other functional devices (for example, devices with display functions) in an intermediate portion of the substrate.

It is to be noted that, although two rows of first drivers are shown in FIG. 2, the scope of the embodiments of the present disclosure is not limited thereto. For example, one or more than two rows of first drivers can be arranged on the substrate. In addition, a plurality of rows of first drivers may be distributed in two dimensions. Furthermore, one or more vibration sensors can also be arranged on the substrate.

Figure 3:
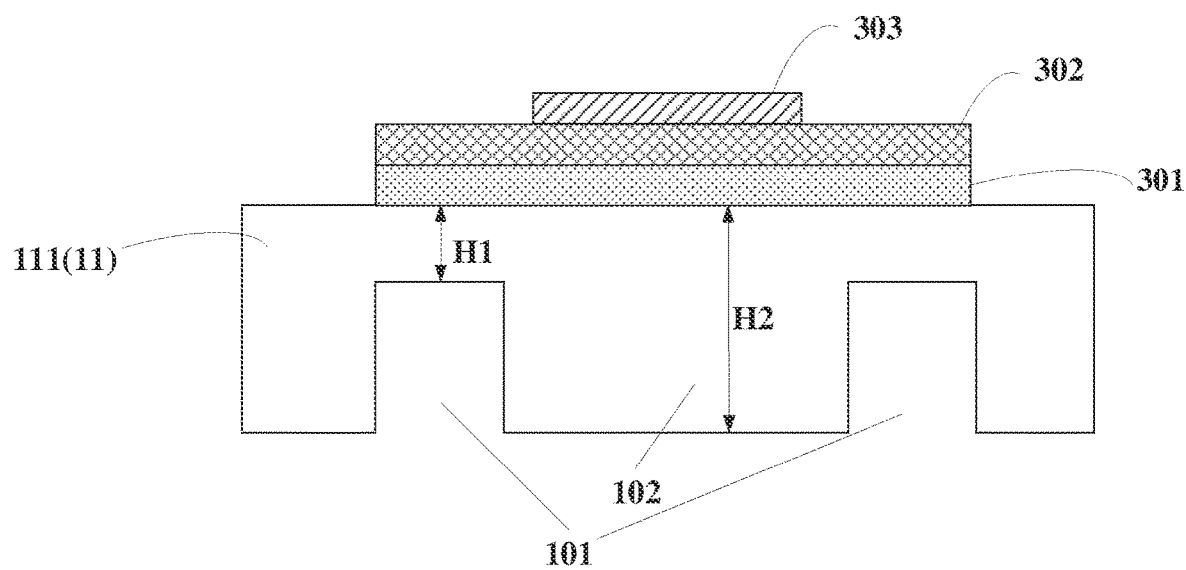
FIG. 3 is a schematic cross-sectional view showing a vibration sensor according to an embodiment of the present disclosure.

FIG. 3 is a schematic cross-sectional view showing a vibration sensor according to an embodiment of the present disclosure. The vibration sensor is a piezoelectric accelerometer. A structure of the piezoelectric accelerometer according to some embodiments of the present disclosure will be described in detail below in conjunction with FIGS. 2 and 3.

As shown in FIGS. 2 and 3, the piezoelectric accelerometer comprises a first bottom electrode 301 on the substrate 11.

As shown in FIGS. 2 and 3, the piezoelectric accelerometer further comprises a first portion 111 of the substrate 11 below the first bottom electrode. Here, the first portion 111 of the substrate also serves as part of the piezoelectric accelerometer. The first portion 111 comprises a recess 101 on a side away from the first bottom electrode 301 and a mass block 102 surrounded by the recess 101. A thickness H1 of part of the first portion 111 at a bottom of the recess 101 in a direction perpendicular to the substrate is less than a thickness H2 of the mass block 102 in the direction perpendicular to the substrate. The recess is provided so that a portion of the substrate at the bottom of the recess is in the shape of a thin film. The recesses can be formed by a process of locally etching a rear of the substrate.

Viewed from a perspective perpendicular to the substrate, a shape of the recess 101 is a circular ring. Of course, the scope of the embodiments of the present disclosure is not limited thereto. Viewed from a perspective perpendicular to the substrate, the shape of the recess may also be other shapes, for example a square ring or a hexagonal ring, which will be described in detail later in conjunction with FIGS. 6 and 7.

As shown in FIGS. 2 and 3, the piezoelectric accelerometer further comprises a first piezoelectric thin film layer 302 on a side of the first bottom electrode 301 away from the substrate. For example, a material of the first piezoelectric thin film layer comprises PZT (lead zirconate titanate piezoelectric ceramics) or the like.

As shown in FIGS. 2 and 3, the piezoelectric accelerometer further comprises a first top electrode 303 on a side of the first piezoelectric thin film layer 302 away from the substrate 11.

The first bottom electrode 301 and the first top electrode 303 are electrically connected to the controller. An orthographic projection of the recess 101 on the substrate 11 at least partially overlaps with an orthographic projection of the first piezoelectric thin film layer 302 on the substrate 11.

The piezoelectric accelerometer utilizes the positive piezoelectric effect of the piezoelectric material. That is, the piezoelectric material generates an electrical signal (serving as the first detection voltage signal) under a mechanical effect and outputs the electrical signal to the controller. The piezoelectric accelerometer is configured to detect a vibration acceleration value when the glass substrate vibrates.

It is to be noted that, although a piezoelectric accelerometer is used here, those skilled in the art can understand that accelerometers with other principles may also be used.

Figure 12:
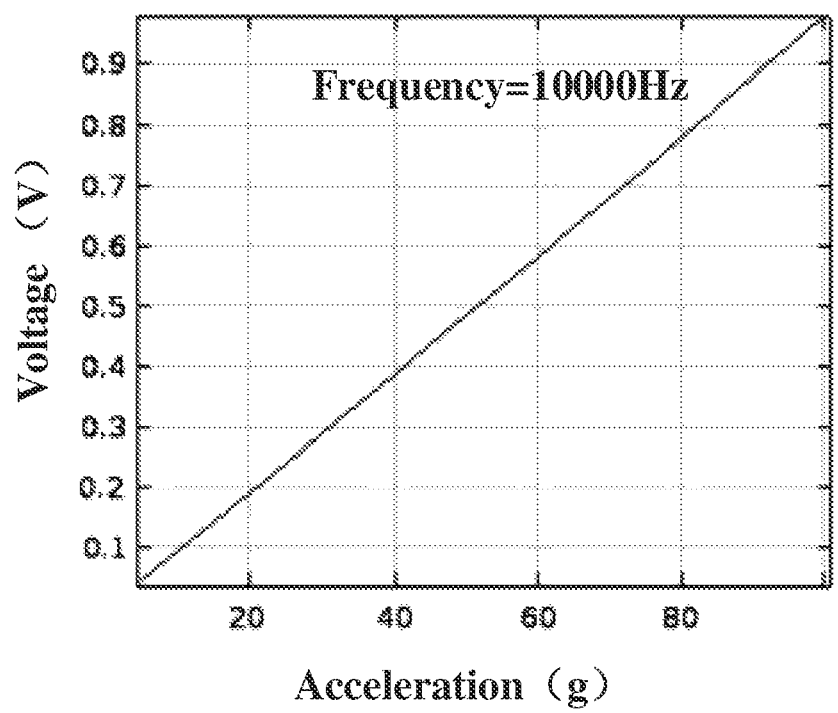
FIG. 12 is a graph showing a relationship between an acceleration and an output voltage value of a piezoelectric accelerometer when an acceleration load is statically loaded according to an embodiment of the present disclosure.

In some embodiments, the piezoelectric accelerometer has a resonant frequency of 20 Hz to 100 kHz. For example, it may be seen from FIG. 12 that in the case of a resonant frequency of 10000 Hz, under the statically loaded acceleration load of 0~100 g (g represents an acceleration of gravity), the output voltage value is linearly related to the loading acceleration. Therefore, the detection voltage signal can be obtained by the piezoelectric accelerometer.

In some embodiments, as shown in FIG. 2, the piezoelectric accelerometer (i.e., the vibration sensor 30) further comprises a first lead-out electrode 304 electrically connected to the first bottom electrode 301 and a second lead-out electrode 305 electrically connected to the first top electrode 303. The first bottom electrode 301 is electrically connected to the controller (not shown in FIG. 2) through the first lead-out electrode 304, and the first top electrode 303 is electrically connected to the controller through the second lead-out electrode 305. In this way, the electrical connection between the piezoelectric accelerometer and the controller is realized.

Figure 4:
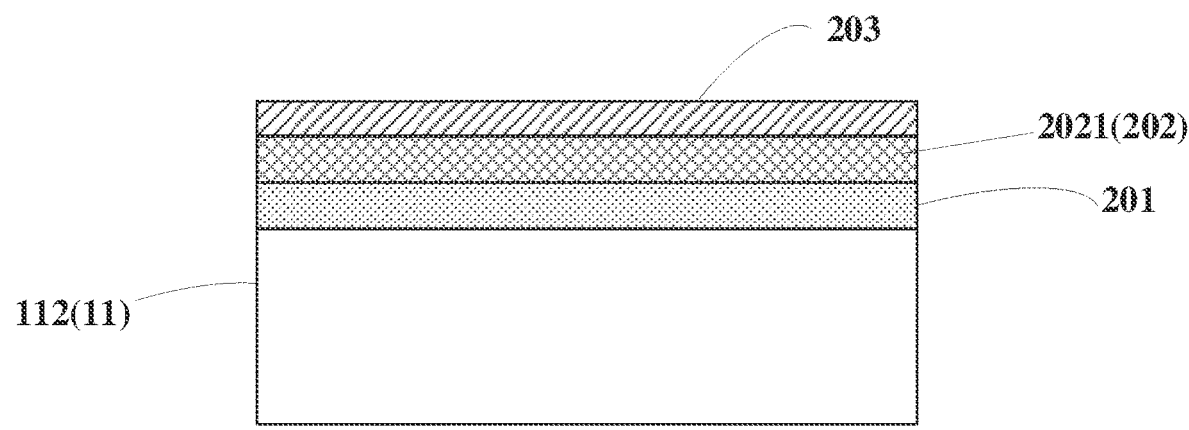
FIG. 4 is a schematic cross-sectional view showing a first driver according to an embodiment of the present disclosure.

FIG. 4 is a schematic cross-sectional view showing a first driver according to an embodiment of the present disclosure. For example, the first driver is a piezoelectric thin film driver.

As shown in FIGS. 2 and 4, the first driver comprises a second bottom electrode 201 on the substrate 11. The first driver further comprises a second portion 112 of the substrate 11 below the second bottom electrode 201. Here, the second portion 112 of the substrate also serves as part of the piezoelectric thin film driver. The first driver further comprises a second piezoelectric thin film layer 202 on a side of the second bottom electrode 201 away from the substrate. For example, a material of the second piezoelectric thin film layer comprises PZT or the like. The first driver further comprises a second top electrode 203 on a side of the second piezoelectric thin film layer 202 away from the substrate. The second bottom electrode 201 and the second top electrode 203 are electrically connected to the controller (not shown in FIGS. 2 and 4).

The first driver utilizes the inverse piezoelectric effect of the piezoelectric material. That is, the piezoelectric material produces a mechanical effect under the effect of an electrical signal. The first driver is configured to drive the substrate to vibrate in the case of driving by an electric signal, so as to generate a haptic feedback effect.

In some embodiments, a material of the first bottom electrode 301 is the same as a material of the second bottom electrode 201, a material of the first piezoelectric thin film layer 302 is the same as a material of the second piezoelectric thin film layer 202, and a material of the first top electrode 303 is the same as a material of the second top electrode 203. This facilitates the manufacture of a haptic rendering device.

For example, a bottom electrode material layer (serving as a seed layer) may be formed on the substrate, and then a patterning process may be performed on the bottom electrode material layer to form the first bottom electrode 301 and the second bottom electrode 201. Next, a piezoelectric thin film layer is formed on the first bottom electrode 301, the second bottom electrode 201 and the substrate, and then a patterning process is performed on the piezoelectric thin film layer to form the first piezoelectric thin film layer 302 and the second piezoelectric thin film layer 202. Next, a top electrode material layer is formed on the first t piezoelectric thin film layer 302, the second piezoelectric thin film layer 202 and the substrate, and then a patterning process is performed on the top electrode material layer to form the first top electrode 303 and the second top electrode 203. Next, a rear of the substrate below the first bottom electrode 301 is etched to form a recess that isolates the mass block from a peripheral substrate area. The first driver and the piezoelectric accelerometer are thus formed. This manufacturing process can achieve the process compatibility between the piezoelectric accelerometer and the piezoelectric thin film driver.

In the above description, the first driver uses a piezoelectric thin film layer. However, those skilled in the art can understand that the first driver may also use other structural layers, such as a piezoelectric ceramic sheet or the like.

In some embodiments, as shown in FIG. 2, the second piezoelectric thin film layer 202 comprises a plurality of second sub-piezoelectric thin film layers 2021, 2022 and 2023. The plurality of second sub-piezoelectric thin film layers 2021, 2022 and 2023 are spaced apart from each other, and arranged along an extending direction of the second bottom electrode 201. For example, as shown in FIG. 2, the plurality of second sub-piezoelectric thin film layers 2021, 2022 and 2023 are arranged along a second direction (for example, a longitudinal direction of the substrate). The second piezoelectric film layer is provided as a plurality of second sub-piezoelectric film layers, so that a finer vibration mode can be provided when the first driver vibrates, thereby facilitating the realization of the haptic rendering function.

In some embodiments, as shown in FIG. 2, the first driver 20 further comprises: a third lead-out electrode 204 electrically connected to the second bottom electrode 201, and a fourth lead-out electrode 205 electrically connected to the second top electrode 203. The second bottom electrode 201 is electrically connected to the controller through the third lead-out electrode 204, and the second top electrode 203 is electrically connected to the controller through the fourth lead-out electrode 205. In this way, the electrical connection between the first driver and the controller is realized.

Figure 5:
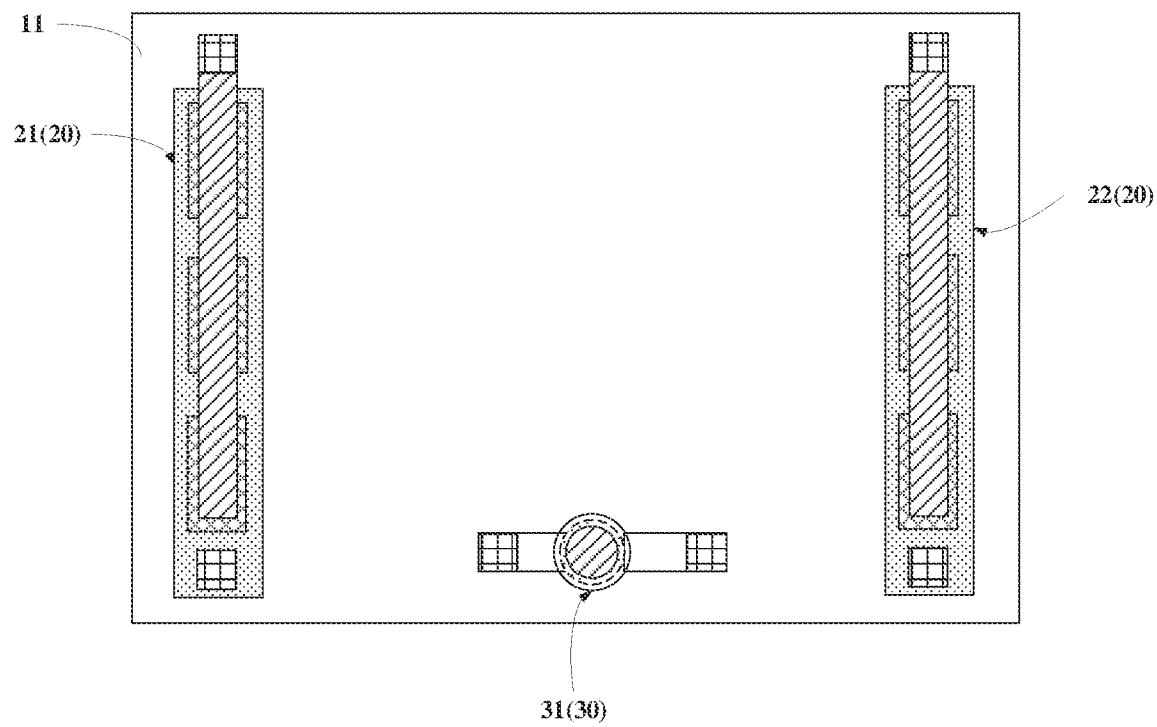
FIG. 5 is a schematic structural view showing a haptic rendering device according to an embodiment of the present disclosure.

In the haptic rendering device of the embodiments described previously, the vibration sensor comprises a plurality of vibration sensors. However, the scope of the embodiments of the present disclosure is not limited thereto. For example, as shown in FIG. 5, the vibration sensor comprises one vibration sensor, that is, one vibration sensor is arranged on the substrate.

Figure 6:
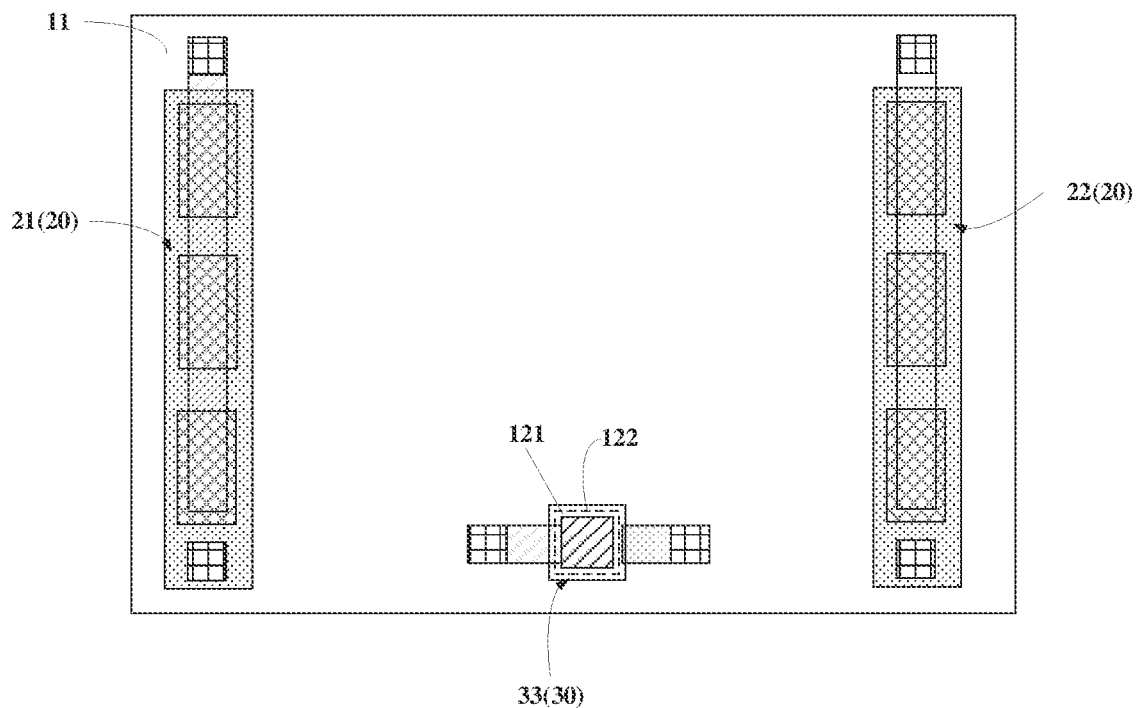
FIG. 6 is a schematic structural view showing a haptic rendering device according to another embodiment of the present disclosure.

FIG. 6 is a schematic structural view showing a haptic rendering device according to another embodiment of the present disclosure. As shown in FIG. 6, viewed from a perspective perpendicular to the substrate 11, a shape of a recess 121 of a piezoelectric accelerometer (serving as a vibration sensor) 33 is a square ring, and a shape of a mass block 122 is also square.

Figure 7:
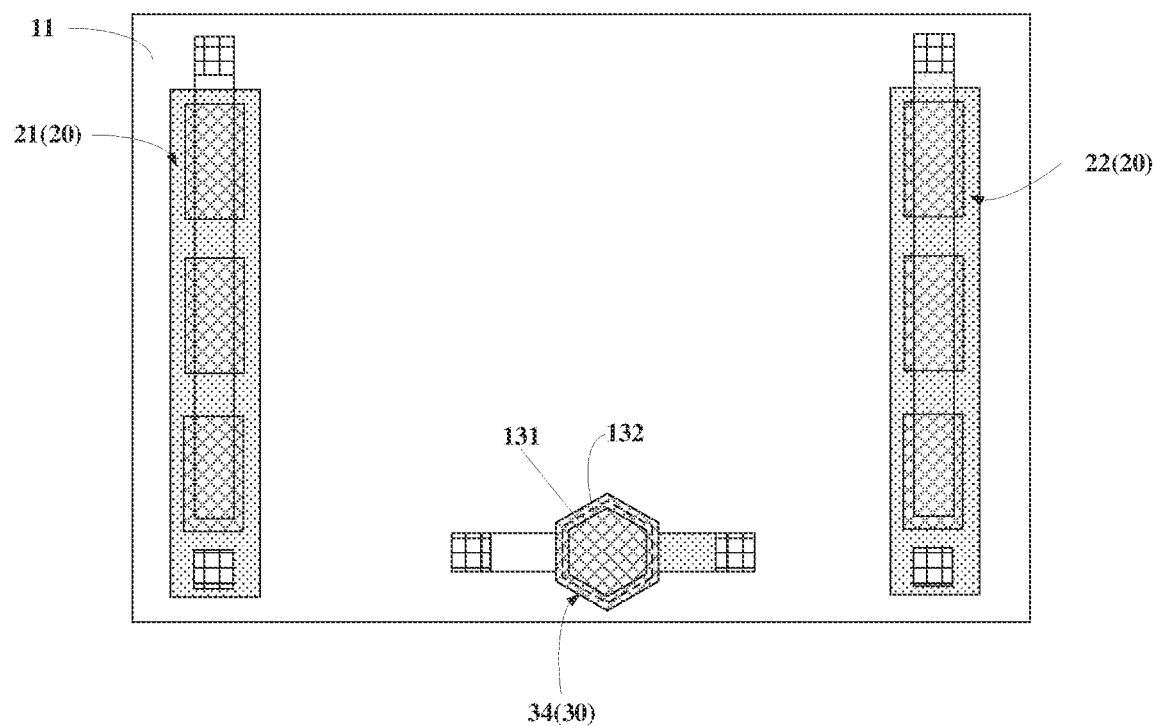
FIG. 7 is a schematic structural view showing a haptic rendering device according to another embodiment of the present disclosure.

FIG. 7 is a schematic structural view showing a haptic rendering device according to another embodiment of the present disclosure. As shown in FIG. 7, viewed from a perspective perpendicular to the substrate 11, a shape of a recess 131 of a piezoelectric accelerometer (serving as a vibration sensor) 34 is a hexagonal ring, and a shape of a mass block 132 is also hexagonal.

Of course, the shapes of the above-described recess and mass block are only exemplary, and the scope of the embodiments of the present disclosure is not limited thereto.

Figure 8:
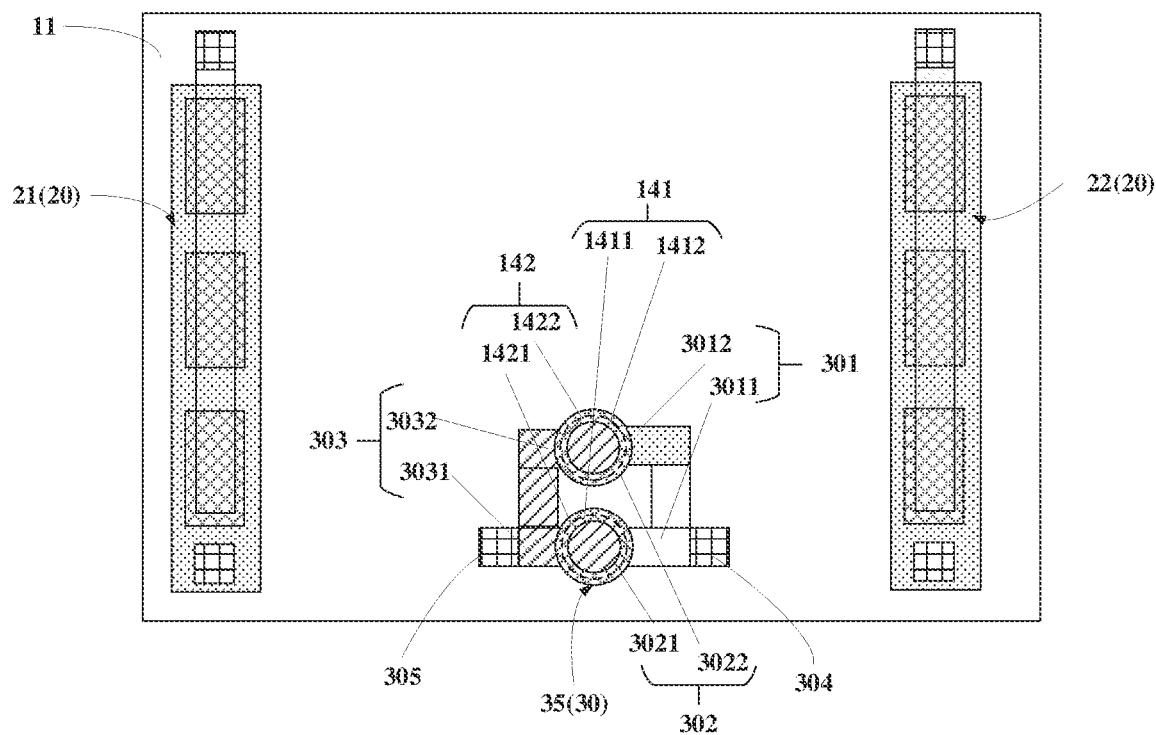
FIG. 8 is a schematic structural view showing a haptic rendering device according to another embodiment of the present disclosure.

FIG. 8 is a schematic structural view showing a haptic rendering device according to another embodiment of the present disclosure.

As shown in FIG. 8, a plurality of (for example, two) piezoelectric accelerometers are provided at an edge of the substrate 11, such that the plurality of piezoelectric accelerometers are designed together to improve the detection sensitivity.

As shown in FIG. 8, the first bottom electrode 301 comprises a plurality of first sub-bottom electrodes 3011 and 3012. The plurality of first sub-bottom electrodes 3011 and 3012 are electrically connected to each other.

As shown in FIG. 8, in the piezoelectric accelerometer, a recess 141 comprises a plurality of sub-recesses 1411 and 1412. A mass block 142 comprises a plurality of sub-mass blocks 1421 and 1422. The plurality of sub-mass blocks 1421 and 1422 are surrounded by the plurality of sub-recesses 1411 and 1412 in a one-to-one correspondence. For example, the sub-mass block 1421 is surrounded by the sub-recess 1411, and the sub-mass block 1422 is surrounded by the sub-recess 1412. The plurality of sub-recesses 1411 and 1412 are below the plurality of first sub-bottom electrodes 3011 and 3012 in a one-to-one correspondence. For example, the sub-recess 1411 is below the first sub-bottom electrode 3011, and the sub-recess 1412 is below the first sub-bottom electrode 3012.

As shown in FIG. 8, the first piezoelectric thin film layer 302 comprises a plurality of first sub-piezoelectric thin film layers 3021 and 3022. The plurality of first sub-piezoelectric thin film layers 3021 and 3022 are on a side of the plurality of first sub-bottom electrodes 3011 and 3012 away from the substrate 11 in a one-to-one correspondence. For example, the first sub-piezoelectric thin film layer 3021 is on a side of the first sub-bottom electrode 3011 away from the substrate 11, and the first sub-piezoelectric thin film layer 3022 is on a side of the first sub-bottom electrode 3012 away from the substrate 11.

As shown in FIG. 8, the first top electrode 303 comprises a plurality of first sub-top electrodes 3031 and 3032. The plurality of first sub-top electrodes 3031 and 3032 are on a side of the plurality of first sub-piezoelectric thin film layers 3021 and 3022 away from the substrate 11 in a one-to-one correspondence. For example, the first sub-top electrode 3031 is on a side of the first sub-piezoelectric thin film layer 3021 away from the substrate 11, and the first sub-top electrode 3032 is on a side of the first sub-piezoelectric thin film layer 3022 away from the substrate 11.

In the above-described embodiments, two piezoelectric accelerometers are integrated together. However, those skilled in the art can understand that, in order to improve the detection sensitivity, more piezoelectric accelerometers can be integrated together. Therefore, the scope of the embodiments of the present disclosure is not limited thereto.

In the embodiments of the present disclosure, a vibration sensor is integrated on the haptic rendering device, an amplitude or frequency of the first driver-substrate resonant body can be measured by the vibration sensor, and the controller adjusts a driving signal by the amplitude or frequency of the first driver-substrate resonant body, thereby controlling the first driver-substrate resonant body to operate in a stable state, and bringing a stable tactile experience to the user.

Figure 9:
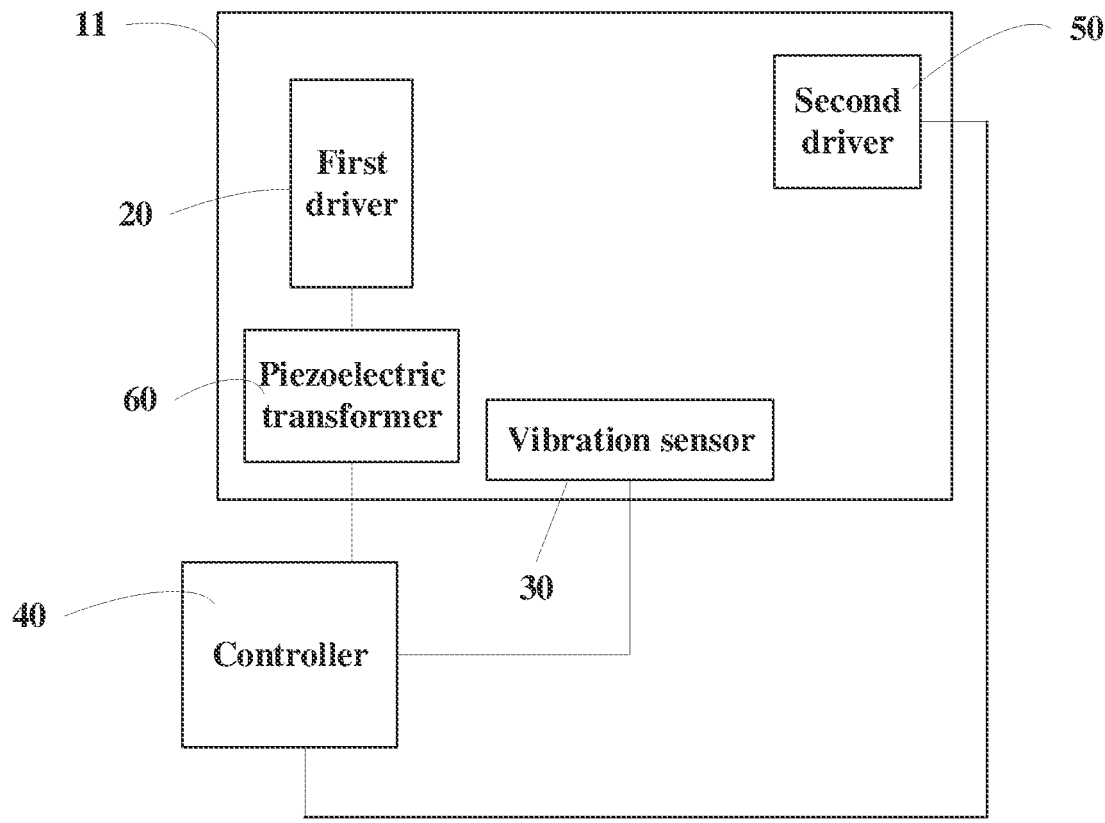
FIG. 9 is a schematic structural view showing a haptic rendering device according to another embodiment of the present disclosure.

FIG. 9 is a schematic structural view showing a haptic rendering device according to another embodiment of the present disclosure.

As shown in FIG. 9, in addition to comprising the substrate 11, the first driver 20, the vibration sensor 30 and the controller 40, the haptic rendering device further comprises a second driver 50.

The second driver 50 is arranged on the substrate 11. The second driver 50 is configured to vibrate and drive the substrate to vibrate after receiving a second driving signal. Here, a vibration frequency of the second driver 50 is less than a vibration frequency of the first driver 20. For example, the second drive 50 comprises an eccentric rotor and/or a linear motor, or the like.

The vibration sensor 30 is further configured to generate a second detection voltage signal according to an amplitude or a frequency at which the second driver 50 vibrates together with the substrate 11 in a case where the substrate vibrates.

The controller 40 is further configured to output the second driving signal to the second driver 50, receive the second detection voltage signal, and adjust the second driving signal according to the second detection voltage signal. For example, the controller 20 is further configured to reduce an amplitude or a duty cycle of the second driving signal in a case where the second detection voltage signal is greater than a second threshold, or increase the amplitude or the duty cycle of the second driving signal in a case where the second detection voltage signal is less than the second threshold.

In the haptic rendering device of the above-described embodiments, a first driver with a relatively high vibration frequency and a second driver with a relatively low vibration frequency are also provided on the substrate, so that the boundary touch effect is produced by the film pressing effect of the first driver during high-frequency vibration, and the effects such as tapping, or warning are produced by low-frequency pressing, vibration of the second driver, thereby enhancing the haptic experience.

In other embodiments, the second driver may not be provided. Rather, a low-frequency signal is loaded on the first driver to produce a haptic feedback effect of low-frequency vibration.

In some embodiments, as shown in FIG. 9, the haptic rendering device further comprises a piezoelectric transformer 60. The piezoelectric transformer 60 is arranged on the substrate 11. The piezoelectric transformer 60 is electrically connected between the controller 40 and the first driver 20. The piezoelectric transformer 60 is configured to receive the first driving signal from the controller 40, amplify the first driving signal and output an amplified first driving signal to the first driver 20 to drive the first driver to vibrate. Of course, those skilled in the art can understand that the piezoelectric transformer may also be integrated into the controller.

In the embodiments of the present disclosure, the above-described haptic rendering device may be applied to consumer electronics (for example, notebook virtual keys, touchpads), automobile central control systems, indoor and outdoor advertising display, hospitals, and the like.

In some embodiments of the present disclosure, a display device is also provided. The display device comprises the haptic rendering device as described above. For example, the display device may be a mobile phone, a notebook computer, a tablet computer, a central control display screen of an automobile, indoor and outdoor advertising display screens, or the like. Such display device can realize a haptic rendering function whilst realizing a display function.

Figure 10:
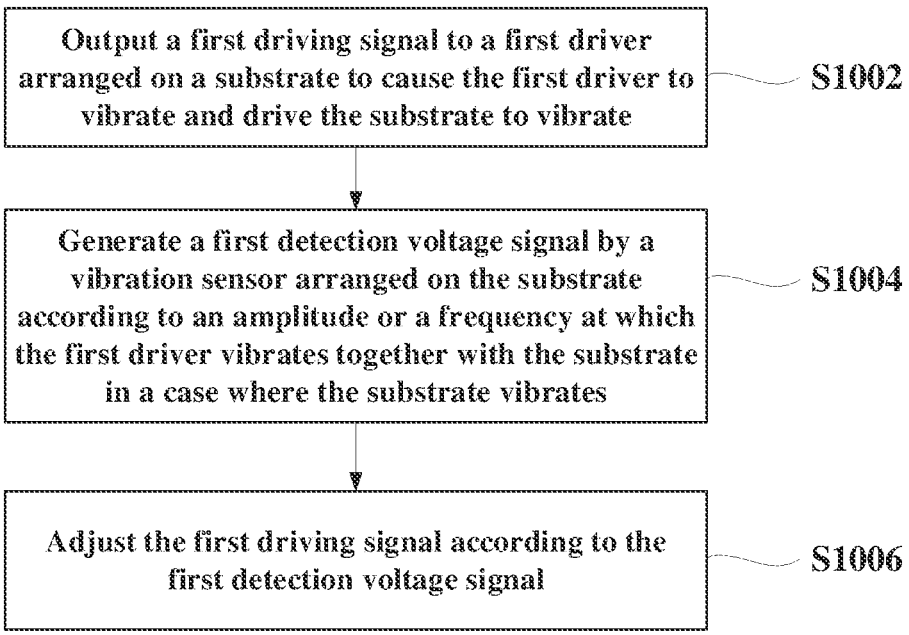
FIG. 10 is a flowchart showing a haptic rendering method according to an embodiment of the present disclosure.

FIG. 10 is a flowchart showing a haptic rendering method according to an embodiment of the present disclosure. As shown in FIG. 10, the haptic rendering method comprises steps S1002 to S1006.

In step S1002, a first driving signal is output to a first driver arranged on a substrate to cause the first driver to vibrate and drive the substrate to vibrate.

In step S1004, a first detection voltage signal is generated by a vibration sensor arranged on the substrate according to an amplitude or a frequency at which the first driver vibrates together with the substrate in a case where the substrate vibrates.

In step S1006, the first driving signal is adjusted according to the first detection voltage signal.

In some embodiments, the step S1006 comprises: reducing an amplitude or a duty cycle of the first driving signal in a case that the first detection voltage signal is greater than a threshold value; or increasing the amplitude or the duty cycle of the first driving signal in a case where the first detection voltage signal is less than the threshold value.

So far, a haptic rendering method according to some embodiments of the present disclosure is provided. The haptic rendering method comprises: outputting a first driving signal to a first driver to cause the first driver to vibrate and drive the substrate to vibrate; generating a first detection voltage signal by a vibration sensor according to an amplitude or a frequency at which the first driver vibrates together with the substrate in a case where the substrate vibrates; and adjusting the first driving signal according to the first detection voltage signal. In this way, the first driving signal can be optimized so that when the first driving signal causes the first driver to drive the substrate to vibrate, a first driver-substrate resonant body can operate in a stable state, thereby bringing a stable haptic experience to the user.

Figure 11:
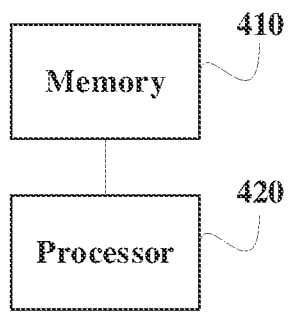
FIG. 11 is a schematic structural view showing a controller according to an embodiment of the present disclosure.

FIG. 11 is a schematic structural view showing a controller according to an embodiment of the present disclosure. The controller comprises a memory 410 and a processor 420.

The memory 410 may be a magnetic disk, a flash memory, or any other non-volatile storage medium. The memory is configured to store instructions in the embodiment corresponding to FIG. 10.

The processor 420 which is coupled to the memory 410, may be implemented as one or more integrated circuits, for example a microprocessor or microcontroller. The processor 420 is configured to execute instructions stored in the memory, so that the first driver-substrate resonant body operates in a stable state, thereby bringing a stable tactile experience to the user.

In another embodiment, the present disclosure also provides a non-transitory computer readable storage medium having computer program instructions stored thereon which, when executed by a processor, implement the steps of the method in the embodiments corresponding to FIG. 10. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (comprising but not limited to disk memory, CD-ROM, optical memory, or the like) containing computer usable program codes therein.

The present disclosure is described in conjunction with the flow charts and/or block views of the methods, devices (systems), and computer program products according to the embodiments of the present disclosure. It will be understood that each step and/or block of the flow charts and/or block views as well as a combination of steps and/or blocks of the flow charts and/or block views may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block view.

These computer program instructions may also be stored in a computer readable memory that may guide a computer or other programmable data processing device to operate in a particular manner, such that the instructions stored in the computer readable memory produce a manufacture comprising an instruction device. The instruction device realizes a function designated in one or more steps in a flow chart and/or one or more blocks in a block view. These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block view.

Hereto, various embodiments of the present disclosure have been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments or equivalently substitution of part of the technical features may be made without departing from the scope and spirit of the present disclosure. The scope of the present disclosure is defined by the appended claims.

What is claimed is:

1. A haptic rendering device, comprising:
   a substrate;
   a first driver arranged on the substrate and configured to vibrate and drive the substrate to vibrate after receiving a first driving signal;
   a vibration sensor arranged on the substrate and configured to generate a first detection voltage signal according to an amplitude or a frequency at which the first driver vibrates together with the substrate in a case where the substrate vibrates; and
   a controller configured to output the first driving signal to the first driver, receive the first detection voltage signal, and adjust the first driving signal according to the first detection voltage signal;
   wherein the vibration sensor comprises an accelerometer, the accelerometer comprises a piezoelectric accelerometer, and the piezoelectric accelerometer comprises:
   a first bottom electrode on the substrate;
   a first portion of the substrate below the first bottom electrode, wherein the first portion comprises a recess on a side away from the first bottom electrode and a mass block surrounded by the recess, wherein a thickness of part of the first portion at a bottom of the recess in a direction perpendicular to the substrate is less than a thickness of the mass block in the direction perpendicular to the substrate;
   a first piezoelectric thin film layer on a side of the first bottom electrode away from the substrate; and
   a first top electrode on a side of the first piezoelectric thin film layer away from the substrate;
   wherein the first bottom electrode and the first top electrode are electrically connected to the controller, and an orthographic projection of the recess on the substrate at least partially overlaps with an orthographic projection of the first piezoelectric thin film layer on the substrate.

2. The haptic rendering device according to claim 1, wherein the controller is configured to reduce an amplitude or a duty cycle of the first driving signal in a case where the first detection voltage signal is greater than a threshold value, or increase the amplitude or the duty cycle of the first driving signal in a case where the first detection voltage signal is less than the threshold value.

3. The haptic rendering device according to claim 1, wherein the piezoelectric accelerometer further comprises:
   a first lead-out electrode electrically connected to the first bottom electrode; and
   a second lead-out electrode electrically connected to the first top electrode;
   wherein the first bottom electrode is electrically connected to the controller through the first lead-out electrode, and the first top electrode is electrically connected to the controller through the second lead-out electrode.

4. The haptic rendering device according to claim 1, wherein a shape of the recess comprises a circular ring, a square ring or a hexagonal ring from a perspective perpendicular to the substrate.

5. The haptic rendering device according to claim 1, wherein:
   the first bottom electrode comprises a plurality of first sub-bottom electrodes, wherein the plurality of first sub-bottom electrodes are electrically connected to each other;
   the recess comprises a plurality of sub-recesses, and the mass block comprises a plurality of sub-mass blocks, wherein the plurality of sub-mass blocks are surrounded by the plurality of sub-recesses in a one-to-one correspondence, and the plurality of sub-recesses are below the plurality of first sub-bottom electrodes in a one-to-one correspondence;
   the first piezoelectric film layer comprises a plurality of first sub-piezoelectric film layers, wherein the plurality of first sub-piezoelectric film layers are on a side of the plurality of first sub-bottom electrodes away from the substrate in a one-to-one correspondence; and
   the first top electrode comprises a plurality of first sub-top electrodes, wherein the plurality of first sub-top electrodes are on a side of the plurality of first sub-piezoelectric thin film layers away from the substrate in a one-to-one correspondence.

6. The haptic rendering device according to claim 1, wherein the first driver comprises:
- a second bottom electrode on the substrate;
- a second portion of the substrate below the second bottom electrode;
- a second piezoelectric thin film layer on a side of the second bottom electrode away from the substrate; and
- a second top electrode on a side of the second piezoelectric thin film layer away from the substrate;
- wherein the second bottom electrode and the second top electrode are electrically connected to the controller.

7. The haptic rendering device according to claim 6, wherein the first driver further comprises:
- a third lead-out electrode electrically connected to the second bottom electrode; and
- a fourth lead-out electrode electrically connected to the second top electrode;
- wherein the second bottom electrode is electrically connected to the controller through the third lead-out electrode, and the second top electrode is electrically connected to the controller through the fourth lead-out electrode.

8. The haptic rendering device according to claim 6, wherein:
- a material of the first bottom electrode is the same as a material of the second bottom electrode;
- a material of the first piezoelectric thin film layer is the same as a material of the second piezoelectric thin film layer; and
- a material of the first top electrode is the same as a material of the second top electrode.

9. The haptic rendering device according to claim 6, wherein the second piezoelectric thin film layer comprises a plurality of second sub-piezoelectric thin film layers, wherein the plurality of second sub-piezoelectric thin film layers are spaced apart from each other and arranged along an extending direction of the second bottom electrode.

10. The haptic rendering device according to claim 1, wherein:
- the first driver comprises a plurality of first drivers arranged on the substrate along a first direction; and
- the vibration sensor comprises a plurality of vibration sensors arranged on the substrate along a second direction;
- wherein the first direction is perpendicular to the second direction.

11. The haptic rendering device according to claim 1, further comprising:
- a piezoelectric transformer arranged on the substrate, electrically connected between the controller and the first driver, and configured to receive the first driving signal from the controller, amplify the first driving signal and output an amplified first driving signal to the first driver to drive the first driver to vibrate.

12. The haptic rendering device according to claim 1, further comprising:
- a second driver arranged on the substrate, and configured to vibrate and drive the substrate to vibrate after receiving a second driving signal, wherein a vibration frequency of the second driver is less than a vibration frequency of the first driver;
- wherein the vibration sensor is further configured to generate a second detection voltage signal according to an amplitude or a frequency at which the second driver vibrates together with the substrate in a case where the substrate vibrates; and
- the controller is further configured to output the second driving signal to the second driver, receive the second detection voltage signal, and adjust the second driving signal according to the second detection voltage signal.

13. A display device, comprising: the haptic rendering device according to claim 1.

14. A haptic rendering method, comprising:
- outputting a first driving signal to a first driver arranged on a substrate to cause the first driver to vibrate and drive the substrate to vibrate;
- generating a first detection voltage signal by a vibration sensor arranged on the substrate according to an amplitude or a frequency at which the first driver vibrates together with the substrate in a case where the substrate vibrates, wherein the vibration sensor comprises an accelerometer, the accelerometer comprises a piezoelectric accelerometer, and the piezoelectric accelerometer comprises: a first bottom electrode on the substrate; a first portion of the substrate below the first bottom electrode, wherein the first portion comprises a recess on a side away from the first bottom electrode and a mass block surrounded by the recess, wherein a thickness of part of the first portion at a bottom of the recess in a direction perpendicular to the substrate is less than a thickness of the mass block in the direction perpendicular to the substrate; a first piezoelectric thin film layer on a side of the first bottom electrode away from the substrate; and a first top electrode on a side of the first piezoelectric thin film layer away from the substrate; wherein the first bottom electrode and the first top electrode are electrically connected to the controller, and an orthographic projection of the recess on the substrate at least partially overlaps with an orthographic projection of the first piezoelectric thin film layer on the substrate; and
- adjusting the first driving signal according to the first detection voltage signal.

15. The haptic rendering method according to claim 14, wherein the adjusting of the first driving signal according to the first detection voltage signal comprises:
- reducing an amplitude or a duty cycle of the first driving signal in a case that the first detection voltage signal is greater than a threshold value; or
- increasing the amplitude or the duty cycle of the first driving signal in a case where the first detection voltage signal is less than the threshold value.

16. A controller, comprising:
- a memory; and
- a processor coupled to the memory, wherein the processor is configured to implement the method according to claim 14 based on instructions stored in the memory.

17. A non-transitory computer readable storage medium having computer program instructions stored thereon which, when executed by a processor, implement the method according to claim 14.

* * * * *